United States Patent Office
3,236,896
Patented Feb. 22, 1966

3,236,896
ISOMERIZATION OF ALPHA,BETA-DIHYDROXY-
ALDEHYDES AND THEIR ETHERS
William J. Sullivan, Oakland, and Paul H. Williams,
Orinda, Calif., assignors to Shell Oil Company, New
York, N.Y., a corporation of Delaware
No Drawing. Filed Mar. 15, 1962, Ser. No. 180,017
6 Claims. (Cl. 260—594)

This invention relates to the production of hydroxymethyl alpha-hydroxyalkyl ketones and mono-ethers thereof by isomerizing the corresponding alpha,beta-dihydroxyaldehydes or beta-ether substituted alpha-hydroxyaldehydes. It deals with a commercially available method for carrying out these isomerizations in an efficient and economical manner.

Hydroxymethyl-alpha-hydroxyalkyl ketones and their monoethers containing an unetherified hydroxymethyl group are valuable compounds having many uses. Dihydroxyacetone in particular is known to have many useful properties which make it suitable for a variety of applications either directly or after conversion to one of its numerous chemical derivatives. It has not been possible to take advantage of these desirable characteristics of these compounds, however, because of their high cost as hitherto produced. Dihydroxyacetone, for example, has been available only as a product of glucose fermentation. In this method of dihydroxyacetone production, yields are relatively low and the initial product is contaminated with carbohydrates and by-products which are difficult to remove. The result has been that high quality dihydroxyacetone has been too expensive to be a large volume commercial product.

An important object of the present invention is the provision of a method for producing hydroxymethyl alpha-hydroxyalkyl ketones and their monoesters of the above-indicated type in a method applicable to large scale operation. A particular object is the provision of a method for producing these hydroxyketones without resort to fermentation procedures. Another particular object is the provision of a method of isomerizing alpha,beta-dihydroxyaldehydes and their beta-ethers. A more specific object is to provide a method for isomerizing glyceraldehyde and beta-alkoxylactaldehyde which is suitable for commercial production of dihydroxyacetone and its mono-alkyl ethers. Still another special object is the economical manufacture of dihydroxyacetone from glyceraldehyde. Further objects and advantages of the invention will be apparent from the following description of the new method in which its application to the isomerization of glyceraldehyde will be emphasized because of the special advantages of the process as applied to this reaction. But it will be understood that this is not intended to be restrictive of the invention which is also useful for similar isomerization of other alpha-beta-dihydroxyaldehydes and beta-ethers thereof.

Glyceraldehyde and its monomethyl ether were isomerized by H. O. L. Fischer and coworkers many years ago. For these reactions they used solutions of glyceraldehyde dimer or its mono-methyl ether in pyridine in which the hole ratio of pyridine to glyceraldehyde dimer or its ether was greater than 10:1. see Berichte der Deutschen Chemischen Gesellschaft, volume 60, pages 479–485 (1927), and volume 65, pages 345–349 (1932). Under these conditions the yields of dihydroxyacetone and its ether were too low for the process to be economically attractive for large scale manufacture of hydroxymethyl alpha-hydroxyalkyl ketones or their monoethers.

It has now been found that alpha,beta-dihydroxyaldehydes and their ethers of the formula

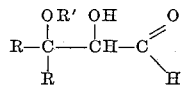

wherein R represents a member of the group consisting of hydrogen and lower alkyl, particularly alkyl of 1 to 3 carbon atoms and R' represents hydrogen or a hydrocarbon group of 1 to 10 carbon atoms can be isomerized to high yields of the corresponding dihydroxy ketone or monoether thereof of the formula

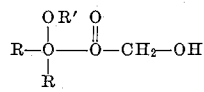

by contacting said aldehyde with a solution of a tertiary amine in an organic liquid which is inert under the isomerization conditions and contains less than one equivalent of amine per mole of total aldehyde and its ketone isomerzation product present in the mixture.

It is essential that tertiary amine be used as the catalyst for the reaction. It has been found that other types of bases cause excessive degradation of glyceraldehyde under isomerization conditions. Thus, even small amounts of sodium or potassium hydroxides or carbonates or magnesia or lime can promote decomposition of glyceraldehyde to carbon dioxide and water at elevated temperatures. Apparently tertiary amines as a class are unique in supplying the required catalytic activity with minimum undesirable side reactions when used in the proper small amount according to the invention. But it is very important that the tertiary amine be used only in the specified small proportions. Large amounts such as used by Fischer et al. lead to low yields of desired products. It was unexpected to find that catalytic amounts were not only effective in bringing about the desired isomerization but also result in so much higher yields as to make the process commercially attractive for the production of the valuable hydroxymethyl alpha-hydroxyalkyl ketones and their monoethers.

Any tertiary amine can be used as the catalyst in the new process. Aliphatic, aromatic and heterocyclic tertiary amines are all suitable. For best results it is desirable to use tertiary amines which are free from substituents reactive with the starting aldehyde or its desired isomerization product under the reaction conditions. Preferred amines are those which contain tertiary amine groups as the only functional groups in the molecule. Most advantageously, the tertiary amines used are those composed only of carbon, hydrogen and tertiary amino nitrogen atoms. Representative examples of suitable amines of this type are the following tertiary amines having 3 to 54 carbon atoms per molecule, the trialkyl amines such as trimethylamine, N-methyl diethylamine, N-methyl-N-ethyl isopropylamine, tri(2-methylhexyl)amine, tridecylamine, trioctadecylamine, etc.; unsaturated aliphatic tertiary amines such as triallylamine, trimethallylamine, N,N-dimethyl oleylamine, trioleylamine, trilinoleylamine, and the like; alicyclic tertiary amines, as for instance, N,N-dimethyl cyclohexylamine, tricyclohexylamine, N,N- diethyl methylcyclohexylamine, trihexahydrobenzylamine, N,N-dimethylcyclohexenylamine, N-methyl-N-crotyl tetrahydrobenzylamine, etc.; aromatic tertiary amines such as N,N-dimethylaniline, N-methyl-N-ethyl meta-toluidine, N-methyl-N-allyl-2,3-xylidine, N,N-dimethylbenzylamine, N,N - diethylphenethylamine, N,N - dimethyl-1-naphthalenemethylamine, tribenzyl amine, and the like; heterocyclic tertiary amines, such, for instance, as pyridine, N-methylpyrrole, N-methylindole, N-ethyl-pyrroline, N-propylpyrrolidine, 2-methylpyridine, quinoline, isoquinoline, N,N-diallylaniline, etc.

Instead of monoamines one can use polyamines as the catalysts for the isomerization. Examples of suitable polytertiary amines are:

N,N,N',N'-tetramethylethylenediamine;
N,N,N',N'-tetraethylputrescine;
N,N,N',N'-tetramethyl-para-phenylenediamine;
N,N,N',N'-tetramethyl-1,2-propanediamine;
N,N-diethyl-2-aminopyridine,
N,N,N'-trimethyl-2-aminopyrrole;
N,N-dimethyl-1-aminoacridine;
N,N,N',N',N''-pentamethyldiethylenetriamine and the like.

As previously indicated, amines substituted by non-reactive substituents can be used in place of the foregoing preferred unsubstituted amines. Substituents such, for example, as halogen, particularly chlorine and bromine atoms, ether groups, thioether groups, and the like are suitable. Examples of such substituted amines include: chloromethyl dimethylamine, tri(beta-chloroethyl)amine, dibromomethyl diethylamine, N,N - dimethyl - 2 - furanamine; N,N-diethyl-2-para-dioxanamine; trifurfurylamine, thiazole, and the like. The amines whether substituted or unsubstituted can be used as individual tertiary amines or as mixtures of two or more such amines.

Not more than one equivalent weight of tertiary amine will usually be used per mole of alpha-hydroxyaldehyde to be isomerized. More advantageously the proportion of tertiary amine is maintained between about 0.01 and about 0.75, most preferably about 0.1 to about 0.6 wt. equivalent, per mole of total alpha-hydroxyaldehyde and hydroxymethyl ketone isomerization product thereof in the mixture.

The temperature of isomerization is not critical but in order to insure a satisfactory conversion in a reasonable time, it is usually desirable to operate at elevated temperatures below the decomposition temperature of the starting alpha-hydroxyaldehyde and its isomerization product. The isomerization is generally best carried out at above about 40° C. and usually temperatures between about 50° C. and the boiling point of the reaction mixture are satisfactory. Sufficient pressure is desirable to maintain at least part of the alpha-hydroxyaldehyde in liquid phase throughout the reaction.

It is advantageous to use an inert solvent for the chosen tertiary amine in order to reduce the danger of contact of the alpha-hydroxyaldehyde and/or its isomerization product with excessive concentrations of amines which may promote undesirable side reactions and reduce the yield of desired hydroxymethyl ketone product. Suitable solvents include hydrocarbons such, for instance, as benzene, toluene, hexane, isooctane, kerosene or other petroleum fractions, etc., halogenated hydrocarbons such as chloroform, carbon tetrachloride, and dichlorobenzene, ethers such, for example, as diethyl ether, diisopropyl ether, furane, dihydrofurane and dioxane, alcohols such as methyl alcohol, ethyl alcohol, isopropyl alcohol, isoamyl alcohol, etc., and similar solvents for the amine. The solvent used may be one which also dissolves the starting hydroxyaldehyde but this is not essential as good results have been obtained with non-homogeneous reaction mixtures containing a solution of the tertiary amine as a separate liquid phase. Whatever solvent for the amine is chosen, if any, the reaction is most advantageously carried out under substantially anhydrous conditions. Since glyceraldehyde is usually produced in aqueous media and it is difficult to remove the water completely by distillation it is often convenient to employ in the isomerization a solvent for the tertiary amine which forms an azeotrope with water and so can be employed as an aid in removing the last traces of the water by azeotropic distillation. Advantageously an amount of inert anhydrous organic solvent for the tertiary amine is used which provides a concentration of amine therein between about 0.005 and about 25 mole percent and more preferably between about 0.05 and about 15 mole percent.

One useful method of operation when employing an aqueous solution of glyceraldehyde as the starting material is to add to the solution an organic solvent for the glyceraldehyde which precipitates impurities which may be present in the aqueous glyceraldehyde solution. Lower aliphatic alcohols, dioxane, sulfolane, dimethyl formamide and the like are examples of solvents which can be used in this way. The precipitate is filtered off and the water then removed, for example, by distillation. This modification of the invention facilitates production of dihydroxyacetone of higher purity from aqueous impure glyceraldehyde. Drying agents such as anhydrous magnesium or copper sulfate or the like can also be used for water removal, most conveniently by addition before filtration of the precipitated impurities. In either case the chosen tertiary amine or mixture of such amines can then be added in catalytic amount and the mixture heated. Depending upon the temperature used, heating for about 1 to 12 hours will usually be sufficient for substantial isomerization after which the dihydroxymethyl ketone product can be recovered by any suitable method. Other methods of contacting the alpha-hydroxyaldehyde with the tertiary amine in controlled catalytic amount under isomerization conditions can also be employed in carrying out the new process which can be successfully conducted batchwise, intermittently or continuously.

An especially advantageous modification of the invention whereby high purity hydroxymethyl alpha-hydroxy alkyl ketones or their monoethers can be produced without extensive purification of the isomerization product, comprises conversion of the alpha,beta-dihydroxy or alpha-hydroxy-beta-ether aldehyde to a dimeric form before carrying out the catalytic isomerization with tertiary amine. These dimers are 2,5-dihydroxy-3,6-di-alpha-hydroxy lower alkyl-para-dioxanes when starting with alpha-beta-dihydroxyaldehydes and 2,5-dihydroxy-3,6-di-alpha-ether-substituted lower alkyl para-dioxanes when starting with the beta-monoether of the alpha,beta-dihydroxyaldehydes. Glyceraldehyde for example is converted to its crystalline cyclic dimer of the formula

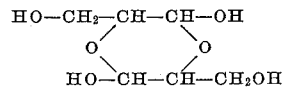

One convenient method for effecting this dimerization is by aging an aqueous solution of the alpha-hydroxyaldehyde of suitably high concentration, for example, about 40 to 70% wt. glyceraldehyde content, until the dimer crystallizes out. This dimer has limited solubility in all solvents except those of a highly polar character such as water, pyridine, and acetic acid. It is preferable to use a less polar or non-polar solvent for the tertiary amine, for instance dioxane, with this dimer. The isomerization can then be carried out by heating a suspension of the crystalline dimer in the solution of the tertiary amine. By using a solution of tertiary amine in a solvent for the dihydroxyacetone product, the course of the reaction can be followed by the disappearance of the solid phase as the isomerization proceeds and it will usually be found that conversion is sufficiently complete in about 15 to 60 minutes' heating after all solid has gone into solution.

The following examples illustrate in more detail suitable methods for carrying out the new process.

*Example I*

To 10.0 g. (0.111 mole) of crystalline glyceraldehyde suspended in 100 ml. of dioxane was added 0.1 g. of triethylamine and the mixture heated 2 hours at 80–90° C. After this time, the glyceraldehyde solid was still in suspension in the mixture. The mixture was thereupon heated to reflux (about 100° C.) and after 10–15 minutes all solid had gone into solution. The solution was heated another 30 minutes and then cooled in ice water without precipitation of solid. The solvent was then stripped from the reaction mixture at steam bath temperature and 1 mm. or less pressure. The residue (10 grams) was dihydroxyacetone which titrated by periodate gave a value of 1.08 equivalents of formic acid per 100 grams indicating about 99% purity (theory for pure dihydroxyacetone 1.09 equivalents per 100 grams). Analysis by paper chromatography indicated the presence of some glyceraldehyde.

*Example II*

Aqueous 40% glyceraldehyde solution was concentrated to a syrup and one mole (90.0 grams, calculated as pure glyceraldehyde) was dissolved in 500 ml. of isopropyl alcohol and filtered to remove dark impurities. The filtrate was reduced to about 300 ml. by distilling to remove residual water as constant boiling mixture. One half mole (39.5 g.) of pyridine was then added and the mixture was refluxed for five hours under a blanket of nitrogen. Isopropyl alcohol and pyridine were then distilled off (finally under low pressure) and the residue was extracted with hot acetone (in which glyceraldehyde is nearly insoluble), leaving a residual syrup containing unisomerized glyceraldehyde. The acetone was stripped from the extract to a final temperature and pressure of 50° C. and less than 1 mm. Analysis of the residue by periodate oxidation gave a value of 1.17 moles (of formic acid)/100 g. (theory for pure dihydroxyacetone, 1.09 equivalents/100 g.).

The identity of the dihydroxyacetone obtained was established by the preparation of its dibenzoate. A 9 g. (0.1 mole) portion of the product was treated with 30 g. (0.213 mole) of benzoyl chloride and 30 g. (0.38 mole) of pyridine in ether. An exothermic reaction occurred and the mixture was then heated on the steam bath for one-half hour. After cooling, the solution was poured into ice water containing 10 ml. of conc. hydrochloric acid. The insoluble product was extracted with benzene and the extract washed with 5% aqueous sodium bicarbonate and dried over anhydrous magnesium sulfate. After stripping off the benzene under reduced pressure, the residue was washed with petroleum ether-ethanol mixture to give 21.8 g. (70.6% yield) of dibenzoate, M.P. 120–121° C. (Heilbron, Dictionary of Organic Compounds, vol. II, p. 204), M.P. 120° C.; mixed M.P. with an authentic sample of the dibenzoate gave no depression. Concentration of the filtrate gave an additional 3.7 g. of derivative, M.P. 120–121° C., making a total of 25.5 g. and indicating a dihydroxyacetone yield of 85.5%. The infrared absorption spectrum of the syrupy dihydroxyacetone was identical with that of pure dihydroxyacetone except for a small peak characteristic of pyridine.

Under similar isomerization conditions, but using ethanol as the solvent, a good conversion to dihydroxyacetone was likewise obtained.

When the reaction was carried out in the same way but with only 5 grams (0.063 mole) of pyridine and 300 ml. of isopropyl alcohol, the conversion to dihydroxyacetone was 60%.

*Example III*

Using dimeric beta-methoxylactaldehyde in place of the glyceraldehyde dimer in the method of Example I gives dihydroxyacetone monomethyl ether in good yield.

While isomerization of glyceraldehyde and its beta-alkyl ethers have been emphasized in the foregoing examples, the invention is not limited thereto since the new process can be successfully carried out with any other aldehyde of the formula

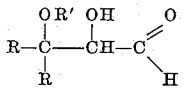

wherein R and R' have the previously indicated significance. Representative examples of other alpha,beta-dihydroxyaldehydes which can be used as starting materials in the process to obtain the corresponding dihydroxyketones are: beta-methylglyceraldehyde to 1,3-dihydroxy-2-butanone, 1,2-dihydroxyvaleraldehyde to 1,3-dihydroxy-2-pentanone, 3-methyl-2,3-dihydroxybutyraldehyde to 3-methyl-1,2-dihydroxy-2-butanone, 3-methyl-2,3-dihydroxyvaleraldehyde to 3-methyl-1,3-dihydroxy-2-pentanone, 1,2-dihydroxycaproaldehyde to 1,3 dihydroxy-2-hexanone, 4-methyl-1,2-dihydroxyvaleraldehyde to 4-methyl-1,3-dihydroxy-2-pentanone, 3-ethyl-1,2-dihydroxypentanal to 3-ethyl-1,3-dihydroxy-2-pentanone, 3-isopropyl-1,2-dihydroxyhexanol to 3-isopropyl-1,3-dihydroxy-2-hexanone, 4,4-dimethyl-1,2-dihydroxypentanal to 4,4-dimethyl-1,3-dihydroxy-2-pentanone, 3,4,4-trimethyl-1,2-dihydroxyhexanal to 3,4,4-trimethyl-1,3-dihydroxy-2-hexanone. Preferred starting alpha,beta-dihydroxyaldehydes are those of 3 to 9 carbon atoms per molecule.

As previously indicated, monoethers of these dihydroxyaldehydes in which the beta-hydroxyl group is etherified and the alpha-hydroxyl group is free, can be isomerized in the same way as the alpha,beta-dihydroxyaldehydes. Representative hydrocarbon groups which can be present in the ether moiety are, for example, alkyl groups of 1 to 10 carbon atoms, for instance, ethyl, isopropyl, tertiary butyl, amyl, octyl and the decyl groups; alkenyl groups of 1 to 10 carbon atoms such as vinyl, allyl, isopropenyl, the butenyl, octentyl and decenyl groups; cycloaliphatic groups of 5 to 10 carbon atoms, as cyclopentyl, cyclohexyl, cyclohexenyl, cyclohexadienyl, hexahydrobenzyl, isopropylcyclohexyl, and the like; and aryl groups of 6 to 10 carbon atoms such as phenyl, xylyl, benzyl, styryl cinnamyl, naphthyl, etc. The preferred starting ether-substituted alpha-hydroxyaldehydes are those having saturated hydrocarbon groups in the ether moiety which most preferably contains 1 to 6 carbon atoms. Examples of this type of aldehyde are alpha-hydroxy-beta-ethoxypropianaldehyde, alpha-hydroxy-beta-propoxybutyraldehyde, alpha-hydroxy-beta-tert.butoxyvaleraldehyde, alpha-hydroxy-beta-amyloxycaproaldehyde and alpha-hydroxy-beta-pentoxy-pelargonaldehyde. Other suitable starting ether-substituted aldehydes are, for instance, alpha-hydroxy-beta-allyloxy-propionaldehyde; alpha-hydroxy-beta-cyclohexyloxy-propionaldehyde; alpha-hydroxy-beta-phenoxy-propionaldehyde and the like.

It will thus be seen that the process of the invention is widely applicable, not only with respect to the aldehydes which can be isomerized but also in regard to the tertiary amines which can be used to catalyze the reaction. The invention is therefore not restricted to the examples of aldehydes and amines which have been given for purposes of illustration only nor by any theory proposed in explanation of the improved results which are obtained. By equivalent weight of tertiary amine as used in the claims we means the molecular weight of the amine divided by the number of tertiary amine groups therein.

We claim as our invention:

1. In a process for producing dihydroxyacetone by isomerizing glyceraldehyde, the improvement which comprises heating, at a temperature above about 40° C., but below the decomposition temperature of glyceraldehyde, a suspension of glyceraldehyde in a solution of a trialkyl amine having 3 to 54 carbon atoms per molecule in an organic liquid which is a solvent for said amine, in which liquid said glyceraldehyde is substantially insoluble, and which liquid is inert to glyceraldehyde and dihydroxyacetone under the isomerization conditions employed, said suspension containing at all times less than one equivalent weight of amine per mole of total glyceraldehyde and dihydroxyacetone present.

2. A process in accordance with claim 1 wherein the isomerization is carried out under substantially anhydrous conditions.

3. A process in accordance with claim 1 wherein a solution of not more than 0.5 mole of trialkyl monoamine per mole of total glyceraldehyde and dihydroxyacetone is used at a temperature of about 50° to about 150° C.

4. A process in accordance with claim 1 wherein the reaction is carried out with triethylamine under substantially anhydrous conditions.

5. A process for producing dihydroxyacetone which comprises:
 (a) dimerizing glyceraldehyde by aging an aqueous solution thereof having in initial concentration of at least 40% by weight until crystals of glyceraldehyde dimer are formed,
 (b) separating said dimer crystals from the aqueous solution,
 (c) heating at a temperature between about 50° C. and the boiling point of the mixture a suspension of said dimer crystals in an organic solvent which is inert under the reaction conditions and contains between about 0.1 and about 0.6 mole of trialkyl monoamine having 3 to 54 carbon atoms per molecule per mole of glyceraldehyde and dihydroxyacetone present,
 (d) and recovering the dihydroxyacetone which is produced.

6. A process for producing dihydroxyacetone which comprises:
 (a) adding an organic solvent for glyceraldehyde to an aqueous solution of impure glyceraldehyde in sufficient amount to effect precipitation of impurities therefrom,
 (b) filtering off the precipitated impurities,
 (c) distilling the thus purified glyceraldehyde solution to remove water therefrom,
 (d) adding to the distilled glyceraldehyde a solution of trialkyl mono-amine having 3 to 54 carbon atoms per molecule in an anhydrous organic solvent for said amine in which said glyceraldehyde is substantially insoluble, the concentration of said amine in said solution being in the range of from about 0.005 to about 25 mole percent, said solution being added to said glyceraldehyde in controlled amount to obtain a suspension of said glyceraldehyde in said solution containing about 0.1 to about 0.6 mole of said trialkyl mono-amine per mole of said glyceraldehyde,
 (e) heating the resulting suspension at between about 50° C. and the boiling point of said suspension,
 (f) and recovering the dihydroxyacetone which is produced.

References Cited by the Examiner

Fischer et al.: Ber. Deut. Chem., vol. 60, pp. 479–85 (1927).

Fischer et al.: Ber. Deut. Chem., vol. 65, pp. 345–52 (1932).

McArdle: Use of Solvents in Organic Chemistry, page 3, 1925 edition, D Van Nostrand, publishers, New York, N.Y.

References Cited by the Applicant

Kirk-Othmer: "Encyclopedia of Chemical Technoogy," pages 102 and 105, second edition, vol. 2 (1963).

LEON ZITVER, *Primary Examiner.*

L. WEINBERGER, D. D. HORWITZ,
*Assistant Examiners.*